United States Patent
Hutton et al.

(10) Patent No.: US 9,230,048 B1
(45) Date of Patent: *Jan. 5, 2016

(54) INTEGRATED CIRCUITS WITH INTERCONNECT SELECTION CIRCUITRY

(71) Applicant: Altera Corporation, San Jose, CA (US)

(72) Inventors: Michael David Hutton, Mountain View, CA (US); Irfan Rahim, Milpitas, CA (US)

(73) Assignee: Altera Corporation, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/502,466

(22) Filed: Sep. 30, 2014

Related U.S. Application Data

(60) Continuation of application No. 13/941,290, filed on Jul. 12, 2013, now Pat. No. 8,854,080, which is a division of application No. 13/345,436, filed on Jan. 6, 2012, now Pat. No. 8,542,032.

(51) Int. Cl.
*H03K 19/173* (2006.01)
*G06F 17/50* (2006.01)

(52) U.S. Cl.
CPC ........ G06F 17/5054 (2013.01); G06F 17/5031 (2013.01); *G06F 2217/06* (2013.01); *G06F 2217/08* (2013.01); *G06F 2217/82* (2013.01); *G06F 2217/84* (2013.01)

(58) Field of Classification Search
USPC .............................................. 326/37–41, 47
See application file for complete search history.

(56) References Cited

U.S. PATENT DOCUMENTS

| | | | |
|---|---|---|---|
| 4,873,459 A | 10/1989 | El Gamal et al. | |
| 5,367,208 A | 11/1994 | El Gamal et al. | |
| 5,412,261 A | 5/1995 | Whitten | |
| 5,414,638 A | 5/1995 | Verheyen et al. | |
| 5,689,195 A | 11/1997 | Cliff et al. | |
| 6,137,308 A | 10/2000 | Nayak | |
| 7,210,115 B1 * | 4/2007 | Rahim et al. | 716/113 |
| 7,248,072 B1 | 7/2007 | Hutton et al. | |
| 2001/0052793 A1 | 12/2001 | Nakaya | |

OTHER PUBLICATIONS

"Embedded Programmable Logic Device Family", Altera Corporation, Data Sheet Version 4.2, Jan. 2003.

* cited by examiner

*Primary Examiner* — Jany Richardson
(74) *Attorney, Agent, or Firm* — Treyz Law Group, P.C.; Jason Tsai

(57) ABSTRACT

Integrated circuits such as programmable integrated circuits may include programmable logic regions that can be configured to perform custom user functions. The programmable logic regions may produce output signals. The integrated circuit may include interconnects that route selected output signals throughout the integrated circuit. The integrated circuit may include output selection circuitry having output selection and interconnect selection stages. The output selection circuitry may be configured to select which of the output signals produced by the programmable logic regions are provided to the interconnects for routing. The interconnect selection stage may be formed using multiplexing circuits or tristate drivers. Logic design system computing equipment may be used to generate configuration data that can be used to program the output selection circuitry to reduce crosstalk by routing signals away from critical interconnects or by double-driving critical interconnects.

18 Claims, 15 Drawing Sheets

INTEGRATED CIRCUITS WITH INTERCONNECT SELECTION CIRCUITRY

This application is a continuation of patent application Ser. No. 13/941,290, filed Jul. 12, 2013, which is a division of patent application Ser. No. 13/345,436, filed Jan. 6, 2012, now U.S. Pat. No. 8,542,032, which are hereby incorporated by reference herein in their entireties. This application claims the benefit of and claims priority to patent application Ser. No. 13/941,290, filed Jul. 12, 2013, and patent application Ser. No. 13/345,436, filed Jan. 6, 2012, now U.S. Pat. No. 8,542,032.

BACKGROUND

This relates to integrated circuits such as programmable integrated circuits with interconnect circuitry.

Programmable integrated circuits are well known. Programmable integrated circuits can be programmed by a user to implement a desired custom logic function. In a typical scenario, a logic designer uses computer-aided design (CAD) tools to design a custom logic circuit. When the design process is complete, the tools generate configuration data. The configuration data is loaded into programmable integrated circuit memory elements to configure the device to perform the functions of the custom logic circuit. In particular, the configuration data configures programmable interconnects, programmable routing circuits, and programmable logic circuits in the programmable integrated circuits.

Programmable integrated circuits include programmable logic circuits that are configured to receive input signals and perform custom functions to produce output signals. The input and output signals to each logic circuit may be provided by interconnects that can be configured to selectively route signals throughout the programmable integrated circuit. Each interconnect typically has a corresponding multiplexing circuit and driver (i.e., the ratio between each interconnect, multiplexing circuit, and driver is 1:1:1). The multiplexing circuit receives the output signals from the logic circuits and selects which of the logic circuit output signals is driven onto the corresponding interconnect. The selected logic circuit output signal is driven onto the interconnect by the driver.

The direct correspondence between a multiplexing circuit, driver, and interconnect (i.e., the 1:1:1 ratio between each multiplexing circuit, driver, and interconnect) can result in inefficient use of resources on a programmable integrated circuit. For example, interconnects may have various types that are each associated with different physical characteristics such as length and resistance. For each type of interconnect, a conventional programmable integrated circuit includes a corresponding multiplexing circuit and driver. To provide a given logic circuit output signal to each of the different types of interconnects, the conventional programmable integrated circuit must provide routing paths (e.g., wires or local interconnects) from the logic circuit that produces the output signal to each of the multiplexing circuits. The routing paths may occupy a significant amount of area on the programmable integrated circuit (e.g., area that could potentially be used to form transistors or other logic circuits).

SUMMARY

Integrated circuits such as programmable integrated circuits may include programmable logic regions that can be configured to perform custom user functions. The programmable logic regions may produce output signals. The integrated circuit may include interconnects that route selected output signals throughout the integrated circuit. Output selection circuitry associated with each programmable logic module may be configured to select which of the output signals produced by that programmable logic module are provided to the interconnects.

The output selection circuitry may include first and second selection stages (e.g., an output selection stage and an interconnect selection stage). The first selection stage may select which of the output signals are to be routed by the interconnects. The second selection stage may select which interconnects are provided with each output signal that is selected by the first selection stage. The selection stages may be controlled by memory elements that produce static control signals. The second selection stage may provide a given output signal that is selected by the first stage to one or more interconnects (e.g., by driving the interconnects with that output signal).

The interconnects may have various physical characteristics. For example, the interconnects may be formed in horizontal and/or vertical directions, on different metal layers, with different lengths, etc. The first and second selection stages may provide each programmable logic region with routing paths to multiple types of interconnects (e.g., horizontal interconnects, vertical interconnects, interconnects of different lengths, interconnects formed on different metal layers, etc.).

The first selection stage may comprise multiplexers that each receives at least some of the output signals produced by the programmable logic regions and produce a corresponding output signal selected from the received output signals. The second selection stage may comprise multiplexers that receive the output signals selected by the first selection stage. Alternatively, the second selection stage may comprise sets of tristate drivers that are coupled to respective interconnects. Each set of tristate drivers may receive the output signals selected by the first selection stage.

The second selection stage may be configured to electrically disconnect some of the interconnects to reduce crosstalk levels between the interconnects (e.g., by disabling tristate drivers that are coupled to those interconnects). If desired, the second selection stage may be configured to simultaneously drive a given interconnect with multiple tristate drivers.

Logic design system computing equipment may be used to generate configuration data for programmable integrated circuits that have output selection and driver circuitry. The configuration data may be used to program the programmable integrated circuits to implement custom user designs. The logic design system computing equipment may store the generated configuration data in storage in the logic design system computing equipment. The generated configuration data may be optimized to reduce crosstalk between interconnects on the programmable integrated circuits.

The logic design system computing equipment may receive user-specified timing or performance requirements that specify a maximum amount of time permitted to convey signals between programmable logic regions via the interconnects. To generate configuration data that satisfies the timing requirements, the logic design system computing equipment may identify one or more critical interconnects that do not satisfy the timing requirements and identify interconnects that are adjacent to the critical interconnects. The logic design system computing equipment may adjust the configuration data to route signals away from the interconnects that are adjacent to the critical interconnects. If desired, the logic design system computing equipment may adjust the configuration data to drive the critical interconnects with multiple tristate drivers.

Further features of the invention, its nature and various advantages will be more apparent from the accompanying drawings and the following detailed description of the preferred embodiments.

DETAILED DESCRIPTION

Figure 1A:
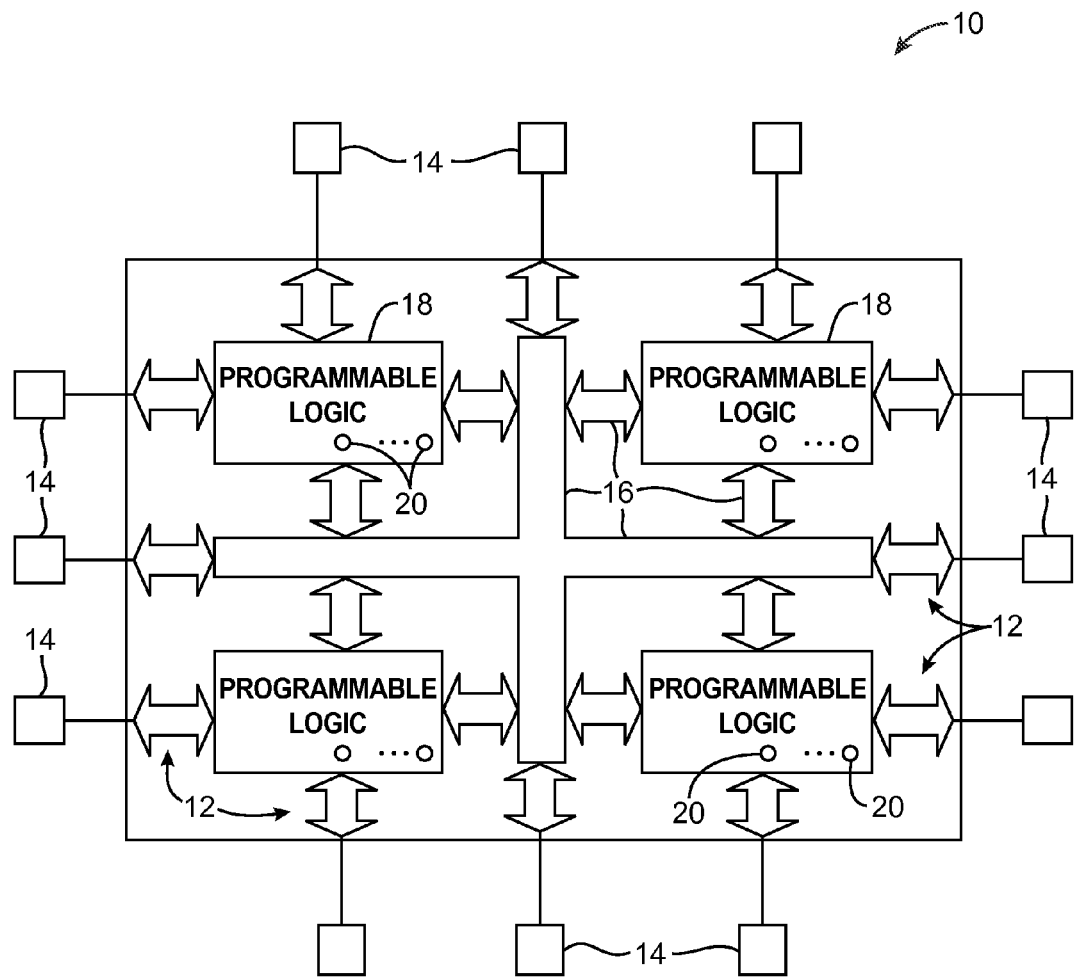
FIG. 1A is an illustrative diagram of a programmable integrated circuit with programmable logic in accordance with an embodiment of the present invention.

The present invention relates to programmable integrated circuits. The programmable integrated circuits may include programmable logic, programmable interconnects, and programmable routing circuitry FIG. 1A shows a diagram of an illustrative programmable integrated circuit device. As shown in FIG. 1A, device 10 may have input-output (I/O) circuitry 12 for driving signals off of device 10 and for receiving signals from other devices via input-output pins 14. Interconnection resources 16 such as global and local vertical and horizontal conductive lines and buses may be used to route signals on device 10. Interconnection resources 16 include fixed interconnects (conductive lines) and programmable interconnects (i.e., programmable connections between respective fixed interconnects). Interconnection resources 16 may sometimes be referred to herein as interconnects (e.g., interconnects formed from combinations of fixed interconnects and programmable interconnects).

Interconnects 16 may be used to interconnect regions of programmable logic such as programmable logic regions 18. Programmable logic regions 18 may sometimes be referred to as logic array blocks or programmable circuit regions. Programmable logic regions 18, may, if desired, contain groups of smaller logic regions. These smaller logic regions, which may sometimes be referred to as logic elements or adaptive logic modules, may be interconnected using local interconnection resources.

Programmable logic regions 18 may include combinational and sequential logic circuitry. For example, programmable logic regions 18 may include look-up tables, registers, and multiplexers. Programmable logic regions 18 may be configured to perform a custom logic function.

Programmable logic regions 18 contain programmable elements 20. Programmable elements 20 may be based on any suitable programmable technology, such as fuses, antifuses, electrically-programmable read-only-memory technology, random-access memory cells, mask-programmed elements, etc. As an example, programmable elements 20 may be formed from memory cells. During programming, configuration data is loaded into the memory cells using pins 14 and input-output circuitry 12. The memory cells are typically random-access-memory (RAM) cells. Because the RAM cells are loaded with configuration data, they are sometimes referred to as configuration RAM cells (CRAM).

Programmable elements 20 may be used to provide static control output signals for controlling the state of logic components in programmable logic 18. The output signals generated by elements 20 are typically applied to gates of metal-oxide-semiconductor (MOS) transistors (sometimes referred to as pass gate transistors).

The circuitry of device 10 may be organized using any suitable architecture. As an example, logic 18 of programmable device 10 may be organized in a series of rows and columns of larger programmable logic regions, each of which contains multiple smaller logic regions. The logic resources of device 10 may be interconnected by interconnection resources 16 such as associated vertical and horizontal conductors. These conductors may include global conductive lines that span substantially all of device 10, fractional lines such as half-lines or quarter lines that span part of device 10, staggered lines of a particular length (e.g., sufficient to interconnect several logic areas), smaller local lines, or any other suitable interconnection resource arrangement. If desired, the logic of device 10 may be arranged in more levels or layers in which multiple large regions are interconnected to form still larger portions of logic. Other device arrangements may use logic that is not arranged in rows and columns.

Figure 1B:
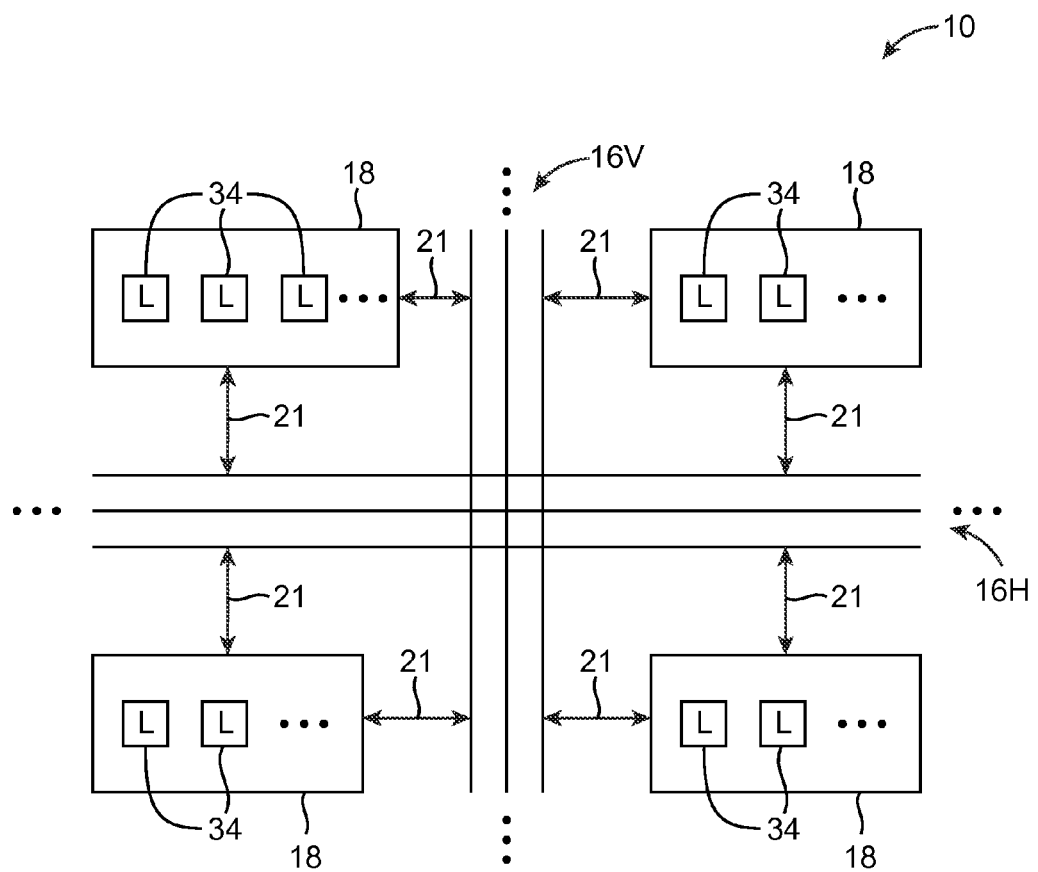
FIG. 1B is an illustrative diagram of input-output circuitry of programmable logic regions configured to drive interconnects in accordance with an embodiment of the present invention.

FIG. 1B shows how programmable logic regions 18 in device 10 may include input-output circuits 21 that can be configured to drive horizontal interconnects 16H (e.g., interconnects formed along a horizontal axis of device 10) and vertical interconnects 16V (e.g., interconnects formed along a vertical axis of device 10). Programmable logic regions 18 may include sub-regions 34 (e.g., logic elements or adaptive logic modules) that receive input signals from interconnects 16V and 16H via input-output circuits 21 and perform custom functions on the input signals to produce output signals. The output signals produced by logic regions 34 may be provided to output circuits of input-output circuits 21. The output circuits may drive the output signals onto selected interconnects.

Figure 2:
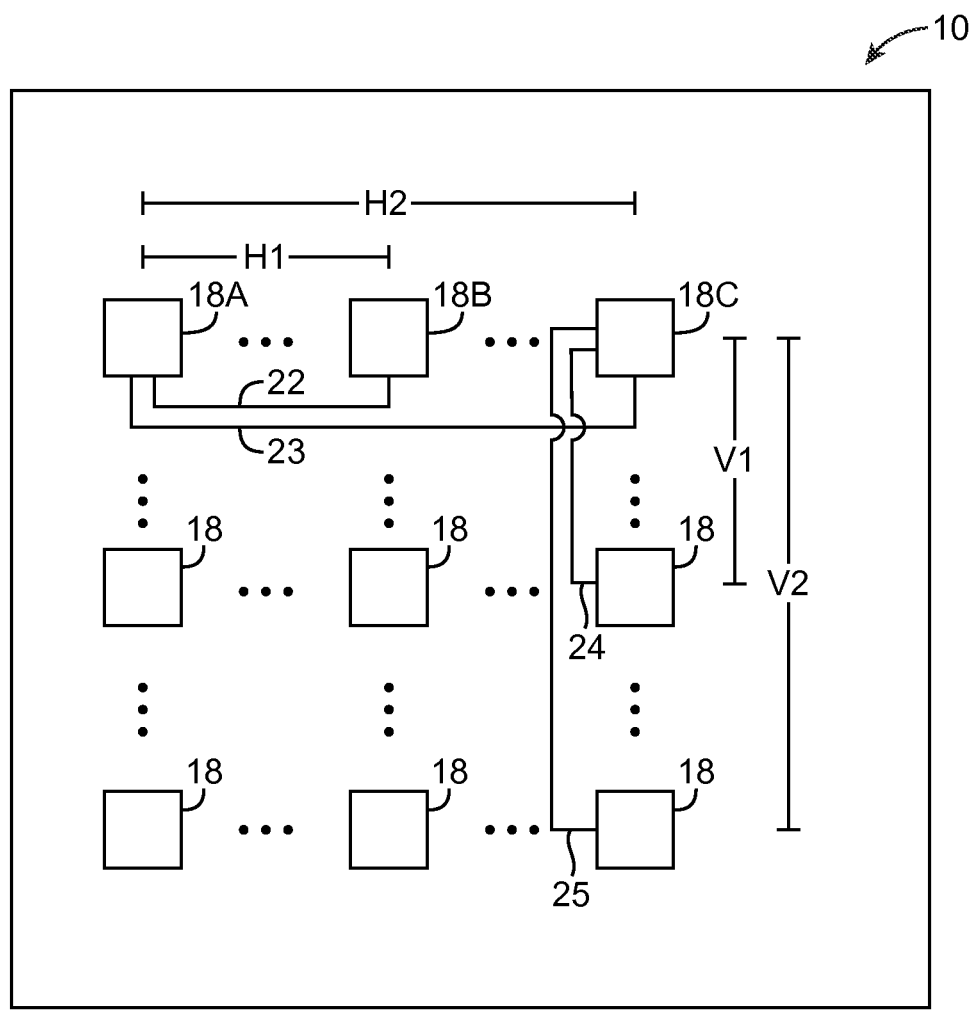
FIG. 2 is an illustrative diagram of interconnects coupled between programmable logic regions in horizontal and vertical directions with different lengths in accordance with an embodiment of the present invention.

FIG. 2 shows an illustrative arrangement in which programmable logic regions 18 are coupled via interconnects such as interconnects 22, 23, 24, and 25. Interconnects 22, 23, 24, and 25 may be formed as part of interconnects 16 of FIG. 1. Interconnects 22 and 23 may be formed along a horizontal axis and therefore be referred to as horizontal interconnects. Interconnects 24 and 25 may be formed along a vertical axis and therefore be referred to as vertical interconnects.

As shown in FIG. 2, horizontal interconnects 22 and 23 and vertical interconnects 24 and 25 may be formed with varying lengths. Horizontal interconnects 22 and 23 may have corresponding lengths H1 and H2 and vertical interconnects 24 and 25 may have corresponding lengths V1 and V2. The horizontal and vertical interconnects may provide programmable logic regions 18 with routing paths throughout device 10 (e.g., to other programmable logic regions 18). Lengths H1, H2, V1, and V2 may vary depending on the distances between programmable logic regions 18 (e.g., length H1 may correspond to the distance between programmable logic regions 18A and 18B, whereas length H2 may correspond to the distance between programmable logic regions 18A and 18C). Each programmable logic region 18 may drive output signals onto the interconnects (e.g., using driver circuits within that programmable logic region 18). Programmable logic regions 18 may drive the interconnects with an appropriate drive strength based on the lengths of the interconnects and/or other physical characteristics of the interconnects. For example, programmable logic region 18A may drive interconnect 23 with a higher drive strength than interconnect 22, because interconnect 23 has a greater resistance than interconnect 22 (e.g., because interconnect 23 is longer than interconnect 22). However, it is appreciated that the drive strength may similarly vary based on the width of the interconnection as well.

Figure 3:
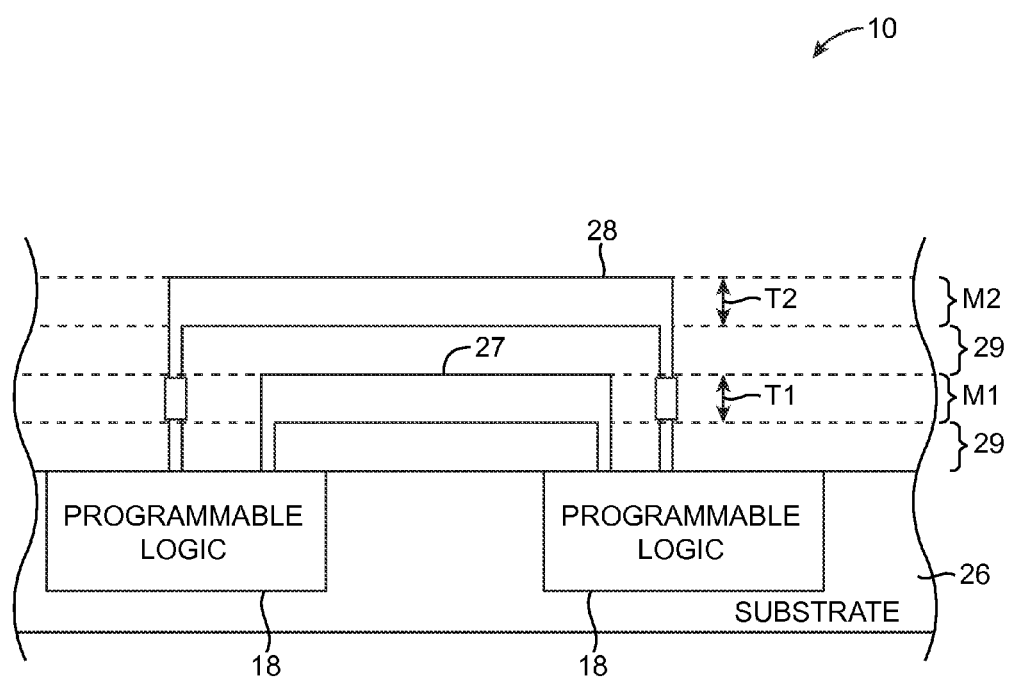
FIG. 3 is an illustrative diagram of interconnects formed on metal layers with different physical characteristics coupling programmable logic regions in accordance with an embodiment of the present invention.

Interconnects may be formed on various metal layers that have different physical characteristics. FIG. 3 shows an illustrative example in which two programmable logic regions 18 are coupled via interconnects 27 and 28 that are formed on different metal layers. As shown in FIG. 3, programmable logic regions 18 may be formed in a substrate 26. Substrate 26 may be formed from material such as n-type or p-type silicon or formed from other suitable substrate materials. Metal layers M1 and M2 may be formed on top of substrate 26. Dielectric layers 29 may be interposed between the metal layers and between the lowest metal layer and the substrate (e.g., dielectric layers 29 may be formed between metal layer M1 and substrate 26 and between metal layers M1 and M2). Dielectric layers 29 may prevent electrical shorting between the metal layers.

Metal layers such as M1 and M2 may be formed with different thicknesses or different materials (e.g., aluminum, copper, etc.). Metal layer M1 may have a thickness T1 that is less than thickness T2 of metal layer M2. For example, metal layer M1 may have a thickness T1 of about 0.7 um, whereas metal layer M2 may have a thickness T2 of about 1 um. The thickness of each metal layer may be inversely proportional to the resistance of interconnects that are formed on that metal layer. For example, interconnect 27 that is formed on a relatively thin metal layer M1 may have a relatively high resistance, whereas interconnect 28 that is formed on a relatively thick metal layer M2 may have a relatively low resistance. In this scenario, programmable logic regions 18 may drive output signals onto interconnect 27 with a higher drive strength than onto interconnect 28.

The example of FIG. 3 in which interconnects 27 and 28 are formed on two different metal layers M1 and M2 is merely illustrative. Device 10 may include multiple different metal layers (e.g., M1, M2, M3, etc.) and interconnects may be formed on any desired metal layer.

Programmable logic regions 18 may include internal routing paths that route output signals from sub-regions (e.g., logic elements or adaptive logic modules) within the programmable logic regions to interconnects. The internal routing paths may occupy a disproportionate amount of area relative to logic circuits in the programmable logic regions. Programmable logic regions 18 may be provided with output selection and driver circuitry that reduces how many internal routing paths are required to route a given output signal from a programmable logic region to different interconnects.

Figure 4:
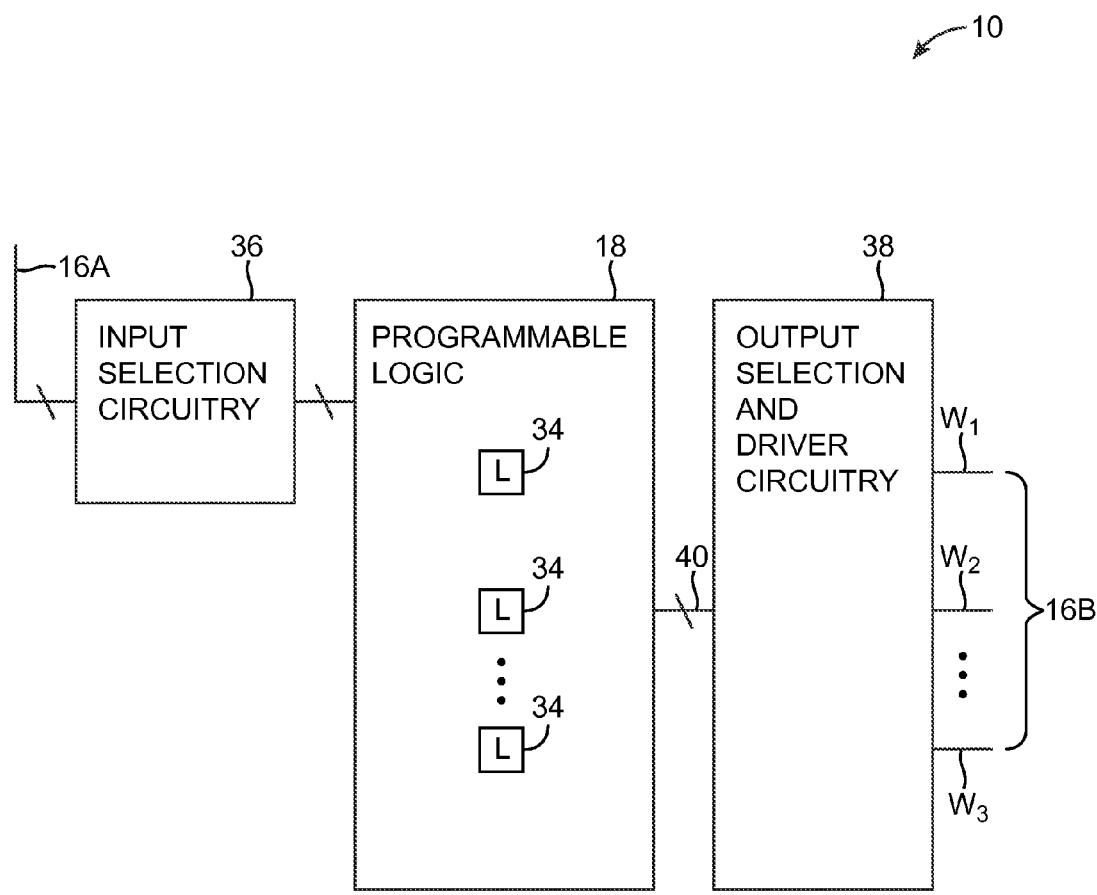
FIG. 4 is an illustrative diagram of programmable logic with output selection and driver circuitry in accordance with an embodiment of the present invention.

A programmable logic region 18 with output selection and driver circuitry 38 is shown in FIG. 4. Programmable logic region 18 (sometimes referred to as a logic array block) may have associated input selection circuitry 36 and output selection and driver circuitry 38. Input selection circuitry 36 and output selection and driver circuitry 38 may be formed as part of input-output circuits such as input-output circuits 21 of FIG. 1A. Input selection circuitry 36 may receive input signals via interconnects 16A. For example, interconnects 16A may provide input signals to programmable logic region 18 from other programmable logic regions 18 or from input/output pins 14. Input selection circuitry 36 may be configured (e.g., by programming CRAM bits that are associated with input selection circuitry 36) to select one or more of the input signals to provide to programmable logic region 18.

Programmable logic region 18 may include smaller regions of programmable logic 34. The smaller programmable logic regions 34 within each programmable logic region 18 may sometimes be referred to as adaptive logic modules (ALMs) or logic elements (LEs). Logic regions 34 may receive the input signals that are selected by input selection circuitry 36 and may perform custom functions on the input signals to produce output signals. The input signals received by each logic region 34 may overlap with input signal portions received by other logic regions 34 (e.g., some of the input signals received by a first logic region 34 may also be received by a second logic region 34). The output signals may be provided to output selection and driver circuitry 38 via output paths 40. The number of logic regions 34 is merely illustrative. If desired, programmable logic region 18 may be formed with any number of logic regions 34 that perform custom functions on input signals that are selected by input selection circuitry 36.

Output selection and driver circuitry 38 may receive output signals via paths 40 and may be configured to provide the output signals to interconnects 16B. If desired, output selection circuitry 38 may be configured to disconnect one or more of interconnects 16B (e.g., by providing no output signal or by providing a high impedance output).

Interconnects 16B may be formed from various types of interconnects. For example, interconnects may be formed on metal layers having different resistances. As another example, interconnects may be formed with different lengths on a given metal layer. To accommodate different types of interconnects, output selection and driver circuitry 38 may include drivers that provide selected output signals to interconnects 16B with appropriate drive strengths. For example, interconnects that are formed on relatively thick metal layers may have decreased resistance and therefore can receive signals from drivers with less driving capability. It is generally desirable to use drivers with less driving capability, because high-capacity drivers typically occupy a larger area and consume more power than low-capacity drivers.

The drive strength of each driver may be adjusted by adjusting the widths of transistors in that driver, adjusting transistor threshold voltages, or other adjustments to circuitry in the driver. For example, a driver may be provided with low voltage threshold transistors (LVT) for increased drive strength or high voltage threshold transistors (HVT) for decreased drive strength.

If desired, output selection circuitry 38 may be configured to provide a given output signal to multiple interconnects 16B. For example, it may be desirable to route an output signal from a given logic region 34 to two different regions of integrated circuit 10. In this scenario, output selection and driver circuitry 38 may provide that output signal to two different interconnects of different lengths.

Figure 5A:
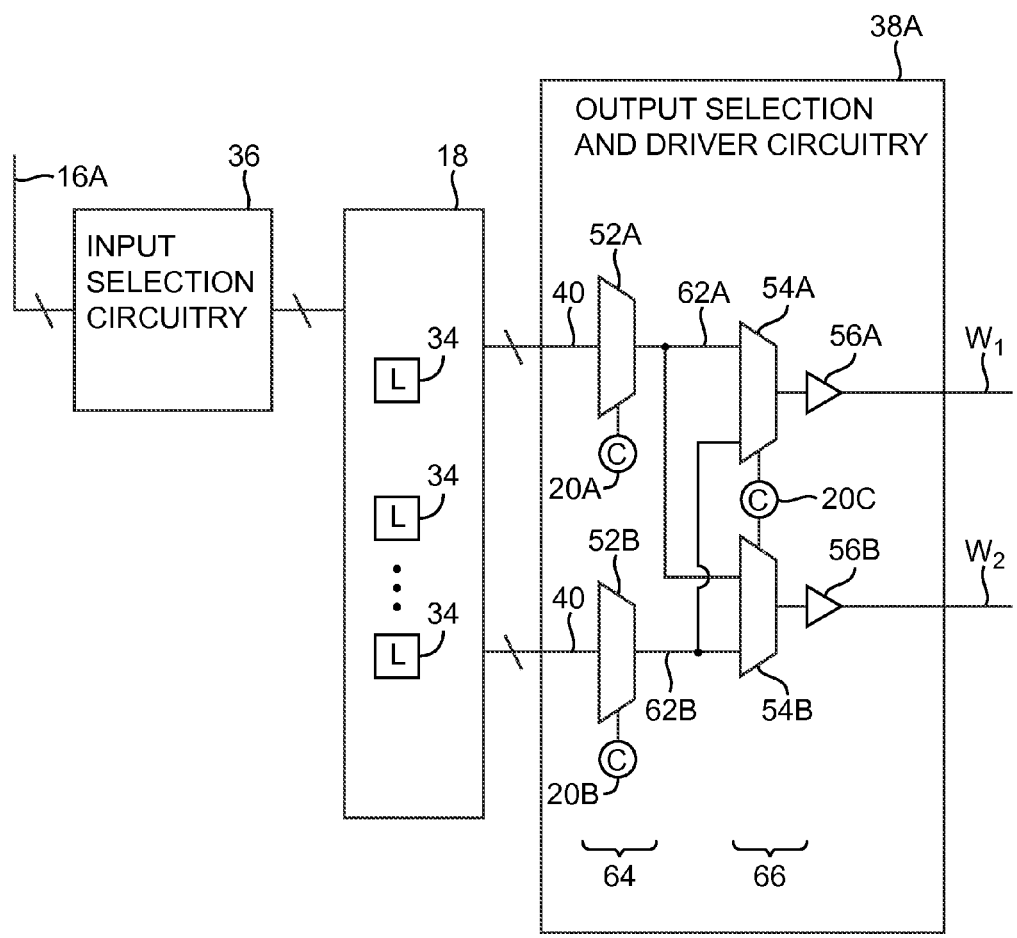
FIG. 5A is an illustrative diagram of output selection and driver circuitry with swap multiplexing circuits for selectively routing logic region output signals to desired interconnects in accordance with an embodiment of the present invention.

FIG. 5A shows an illustrative example in which output selection and driver circuitry 38A may be provided with swap multiplexing circuitry that selects which interconnects are driven by logic region output signals. Output selection and driver circuitry 38A may include multiplexing circuits 52A and 52B that receive signals from logic regions 34 via paths 40 (e.g., from logic regions 34 of programmable logic region 18 of FIG. 4). Any desired combination or sub-combination of output signals from logic regions 34 may be provided to multiplexing circuits 52A and 52B. The output signals may be routed from logic regions 34 to multiplexing circuits 52A and 52B via corresponding paths (e.g., wires or other conductive paths).

Multiplexing circuits 52A and 52B may receive static control signals from corresponding memory elements 20A and 20B. The static control signals may direct multiplexing circuits 52A and 52B to selectively route output signals from logic regions 34 to multiplexing circuits 54A and 54B via respective paths 62A and 62B. For example, memory element 20A may be configured to produce a static control signal to multiplexing circuitry 52A that directs multiplexing circuit 52A to route an output signal from a given logic region 34 to multiplexing circuits 54A and 54B via path 62A.

Multiplexing circuits 54A and 54B may receive the output signals that have been selected by multiplexing circuits 52A and 52B and route the selected output signals to interconnect drivers 56A and 56B. Multiplexing circuits 54A and 54B may receive a static control signal from memory element 20C. The static control signal provided by memory element 20C may select between a first configuration in which the output of multiplexing circuit 52A is coupled to driver 56A and the output of multiplexing circuit 52B is coupled to driver 56B and a second configuration in which the output of multiplexing circuit 52A is coupled to driver 56B and the output of multiplexing circuit 52B is coupled to driver 56A (e.g., swapping the value stored in memory element 20C may also swap the configuration of output selection and driver circuitry 38A).

Drivers 56A and 56B may be coupled to respective interconnects W1 and W2. Drivers 56A and 56B may be designed with drive strengths that are appropriate for driving interconnects W1 and W2. For example, interconnect W1 may be twice the length of interconnect W2. In this scenario, driver 56A may be formed with greater drive strength capability than driver 56B (e.g., because interconnect W1 may have twice the resistance of interconnect W2). As another example, interconnect W1 may have twice the thickness of interconnect W2. In this scenario, driver 56A may be formed with less drive strength capability than driver 56B (e.g., because interconnect W1 may have half the resistance per unit length of interconnect W2).

Multiplexers 52A and 52B may form a first selection stage 64 that determines which output signals are to be provided at output interconnects W1 and W2. Selection stage 64 may therefore sometimes be referred to as an output selection stage. Multiplexers 54A and 54B may form a second selection stage 66 that determines which interconnect will be driven with each selected output signal. Selection stage 66 may therefore sometimes be referred to as an interconnect selection stage.

By providing output selection and driver circuitry 38A with an output selection stage and a separate interconnect selection stage, the number of output signal routing paths that couple logic regions 34 to output selection and driver circuitry 38A may be reduced, because signals that are selected by multiplexing circuits 52A or 52B can be routed to either interconnect W1 or W2. For example, in order to route a given signal from a logic region 34 to interconnect W1 or W2, that output signal need only be provided at one of multiplexers 52A or 52B of output selection stage 64, because multiplexers 54A and 54B (e.g., interconnect selection stage 66) can be configured to select which output interconnect (e.g., W1 or W2) is driven with that output signal.

By reducing the number of output signal paths coupled between logic regions 34 and multiplexing circuits 52A and 52B, area on device 10 that is occupied by routing paths may be reduced (e.g., because routing paths may occupy a disproportionate amount of area compared to functional circuitry in device 10).

The example of FIG. 5A in which multiplexing circuits 54A and 54B are controlled by the same memory element 20C is merely illustrative. If desired, multiplexing circuits 54A and 54B may receive control signals from different memory elements. For example, it may be desirable to independently control the assignment of output signals to each interconnect. By controlling multiplexing circuits 54A and 54B with different memory elements, a given output that is selected by multiplexing circuits 52A or 52B may be simultaneously driven onto interconnects W1 and W2 (e.g., the memory elements may be configured to direct multiplexing circuits 54A and 54B to simultaneously select that output and provide that output to drivers 56A and 56B).

Figure 5B:
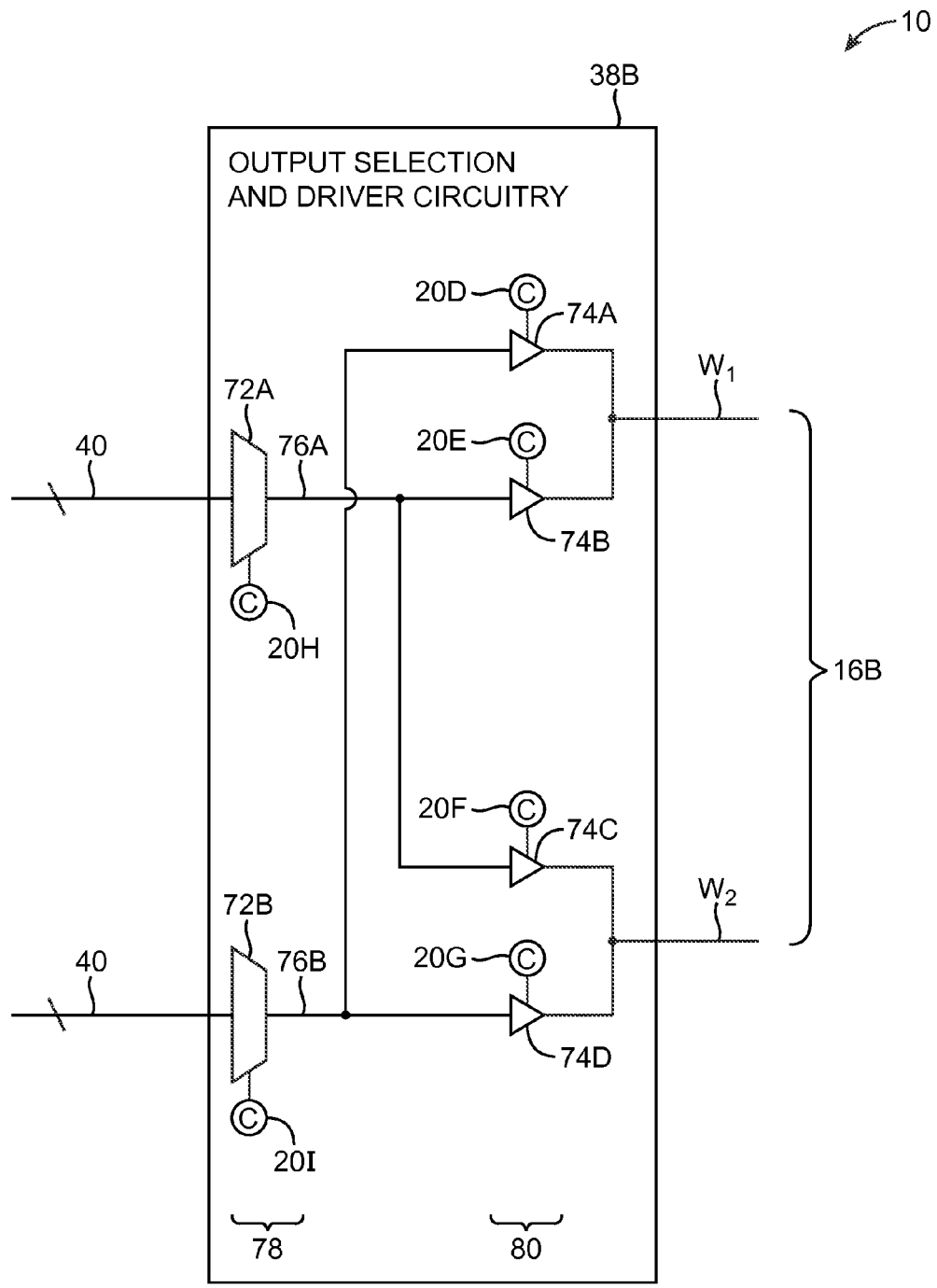
FIG. 5B is an illustrative diagram of output selection and driver circuitry with tristate drivers for selectively routing logic region output signals to desired interconnects in accordance with an embodiment of the present invention.

Output selection circuitry may be implemented using tristate drivers. FIG. 5B shows an illustrative embodiment in which programmable logic 18 is provided with output selection and driver circuitry 38B that is implemented using tristate drivers 74 (e.g., tristate drivers 74A, 74B, 74C, and 74D). Output selection and driver circuitry may include multiplexing circuits 72A and 72B that receive output signals via paths 40 (e.g., signals that are output by logic regions such as logic regions 34 of FIG. 4 may be provided to multiplexing circuits 72A and 72B via paths 40). Each of multiplexing circuits 72A and 72B may be configured via a corresponding memory element 20H or 20I to select a given one of the output signals and provide the selected output signal to the second selection stage 80 via a corresponding path 76A or 76B. Multiplexing circuits 72A and 72B may form a first selection stage 78 (e.g., an output selection stage). Tristate drivers 74A, 74B, 74C, and 74D may form a second selection stage 80 (e.g., an interconnect selection stage).

Tristate drivers 74 may be coupled to respective memory elements 20 (e.g., memory elements 20D, 20E, 20F, and 20G). The output of each memory element 20 may control whether or not a corresponding tristate driver 74 actively drives a corresponding interconnect. In other words, tristate drivers 74 may be enabled or disabled by loading memory elements 20 with appropriate values. For example, memory element 20D may be configured to output either a static low value (e.g., logic zero) or a static high value (e.g., logic one). The output of memory element 20D may direct tristate driver 74A to either drive interconnect W1 with the value provided by multiplexing circuit 72B via path 76B or to disconnect driver 74A from interconnect W1. To disconnect interconnect W1, driver 74A may present a high impedance (hi-Z) output to interconnect W1.

Output selection and driver circuitry 38B may be configured so that an output signal selected by the first stage (e.g., selected by multiplexing circuits 72A or 72B) is driven onto a selected one of interconnects W1 or W2. For example, an output signal selected by multiplexing circuit 72A may be driven onto interconnect W1 by loading memory element 20E with a high value (e.g., logic one) and memory element 20D with a low value (e.g., logic zero). As another example, an output signal selected by multiplexing circuit 72B may be driven onto interconnect W1 by loading memory element 20D with a high value and loading memory element 20E with a low value.

If desired, interconnects W1 and W2 may be simultaneously driven with an output signal selected by the first stage 78. For example, to simultaneously drive interconnects W1 and W2 with an output selected by multiplexing circuit 72A, memory elements 20E and 20F may be loaded with high values (e.g., logic one). As another example, interconnects W1 and W2 may be simultaneously driven with an output selected by multiplexing circuit 72B by configuring memory elements 20D and 20G with logic high values and configuring memory elements 20E and 20F with logic low values.

If desired, output selection and driver circuitry 38B may be configured to drive a given interconnect with two drivers (sometimes referred to as double-driving). For example, the output selection stage 78 may be configured to provide a selected output on paths 76A and 76B. In this scenario, interconnect selection stage 80 may be configured to drive interconnect W1 using tristate drivers 74A and 74B by loading memory elements 20D and 20E with logic high values (e.g., so that tristate drivers 74A and 74B are both enabled). By driving an interconnect with multiple drivers, the signal delay associated with traversing that interconnect may be reduced.

Figure 5C:
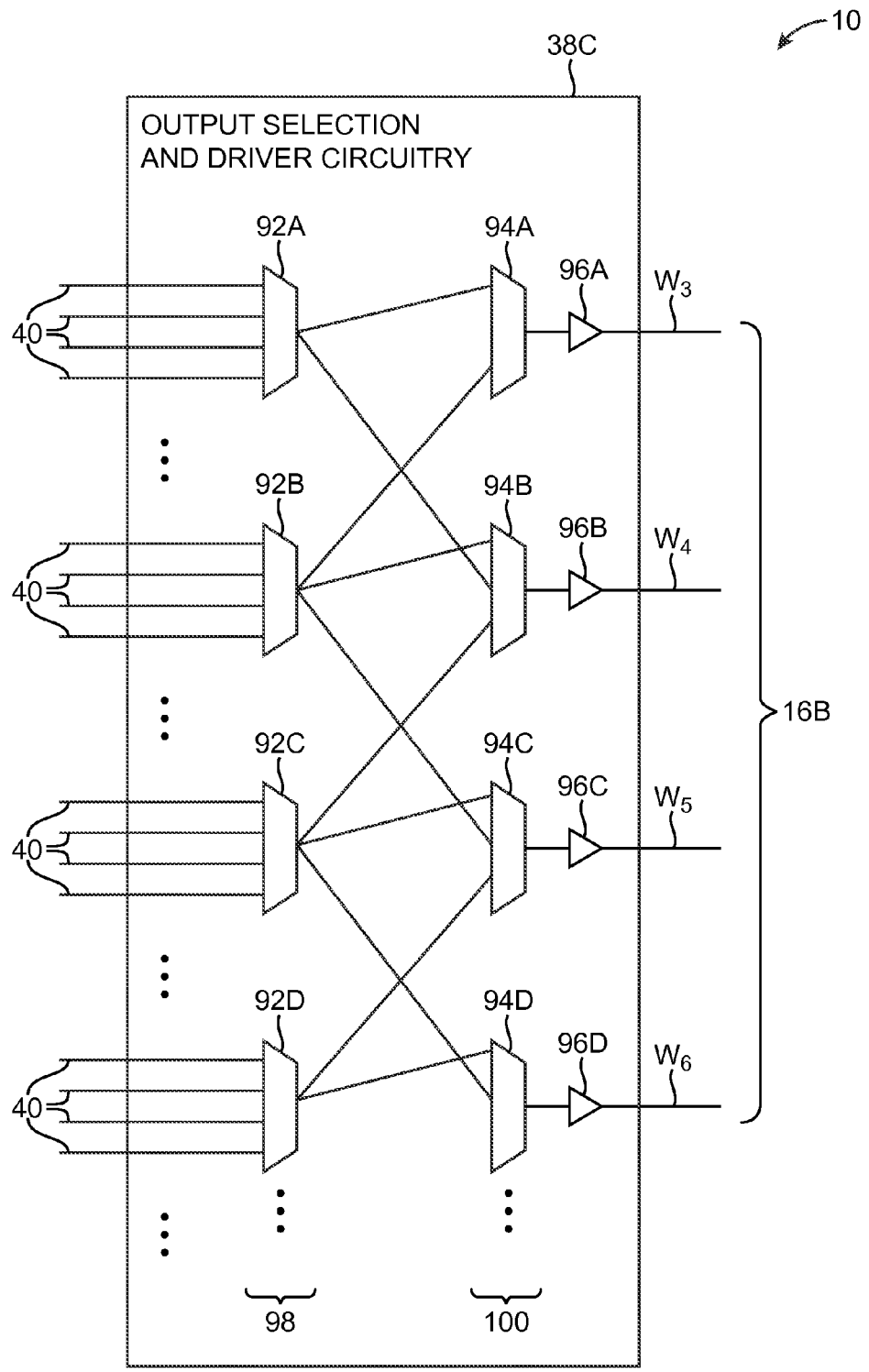
FIG. 5C is an illustrative diagram of output selection and driver circuitry with an output selection stage and an interconnect selection stage formed with multiplexing circuitry in accordance with an embodiment of the present invention.

Multiple different types of interconnects on device 10 may be driven by output selection and driver circuitry 38. The interconnects may be characterized by routing direction (e.g., vertical or horizontal), length (e.g., a length corresponding to a number of programmable logic regions that are traversed by a given interconnect), and/or other physical characteristics. FIG. 5C shows an example in which output selection and driver circuitry 38C may be coupled to multiple different types of interconnects.

As shown in FIG. 5C, output selection and driver circuitry may include drivers 96 (e.g., drivers 96A, 96B, 96C, and 96D) that are coupled to interconnects 16B. Interconnects 16B may include multiple different types of interconnects W3, W4, W5, and W6 (e.g., interconnects W3, W4, W5, and W6 may each have different physical characteristics). For example, interconnect W3 may traverse a horizontal section of device 10 on a first metal layer, interconnect W4 may traverse a horizontal section of device 10 on a second metal layer, interconnect W5 may traverse a vertical section of device 10 on the first metal layer, and interconnect W6 may traverse a vertical section of device 10 on the second metal layer. Each driver 96 may drive a corresponding interconnect with a drive strength appropriate for the type of interconnect that is being driven. For example, interconnects that are relatively long or are formed on relatively thin metal layers may require drivers with relatively high drive strength, whereas interconnects that are relatively short or are formed on thicker metal layers may be sufficiently driven with drivers that have relatively low drive strength. Drive strength may be represented by values normalized by the drive strength of a minimum sized driver (e.g., an inverter). For example, a relatively high drive strength may correspond to four times or eight times the drive strength of a minimum sized driver, whereas a relatively low drive strength may correspond to the drive strength of a minimum sized driver.

Output selection circuitry 38C may be formed with an output selection stage 98 and an interconnect selection stage 100. Output selection stage 98 may include multiplexers 92 (e.g., multiplexers 92A, 92B, 92C, and 92D) that receive output signals from logic regions 34 via paths 40. Each multiplexer 92 may select which of the output signals to provide to interconnect selection stage 100.

Interconnect selection stage 100 may include multiplexing circuits 94 (e.g., multiplexing circuits 94A, 94B, 94C, and 94D) that are each coupled to a respective interconnect driver 96 (e.g., drivers 96A, 96B, 96C, and 96D). Multiplexing circuit (e.g., multiplexer) 94A may be coupled to driver 96A, multiplexer 94B may be coupled to driver 96B, etc. Each multiplexer 94 of interconnect selection stage 100 may receive multiple output signals that have been selected by multiplexers 92 of output selection stage 98. For example, multiplexer 94A may receive the output signals that have been selected by multiplexers 92A and 92B and multiplexer 94B may receive the output signals that have been selected by multiplexers 92A, 92B, and 92C.

Interconnect selection stage 100 may provide output selection and driver circuitry 38C with improved flexibility. For example, the output signal of a given logic region 34 may be provided to multiplexer 92C via paths 40. In this scenario, the output signal may be provided to any combination of interconnects W4, W5, and W6 by configuring multiplexers 92C, 94B, 94C, and 94D to select that output signal.

By separating the selection of output signals via selection stage 98 from the selection of interconnects via selection stage 100, the number of routing paths between logic regions 34 and output selection and driver circuitry 38C may be reduced. Each output signal need only be provided to a multiplexer 92 (or a combination of multiplexers 92) in output selection stage 98 that have access to a sufficient number of interconnect types, because interconnect selection stage 100 provides each multiplexer 92 with access to multiple interconnects. By reducing the number of routing paths required to accommodate multiple interconnect types, the available area on device 10 may be conserved (e.g., because routing paths may occupy a disproportionate amount of area relative to circuits that perform logic functions).

Figure 5D:
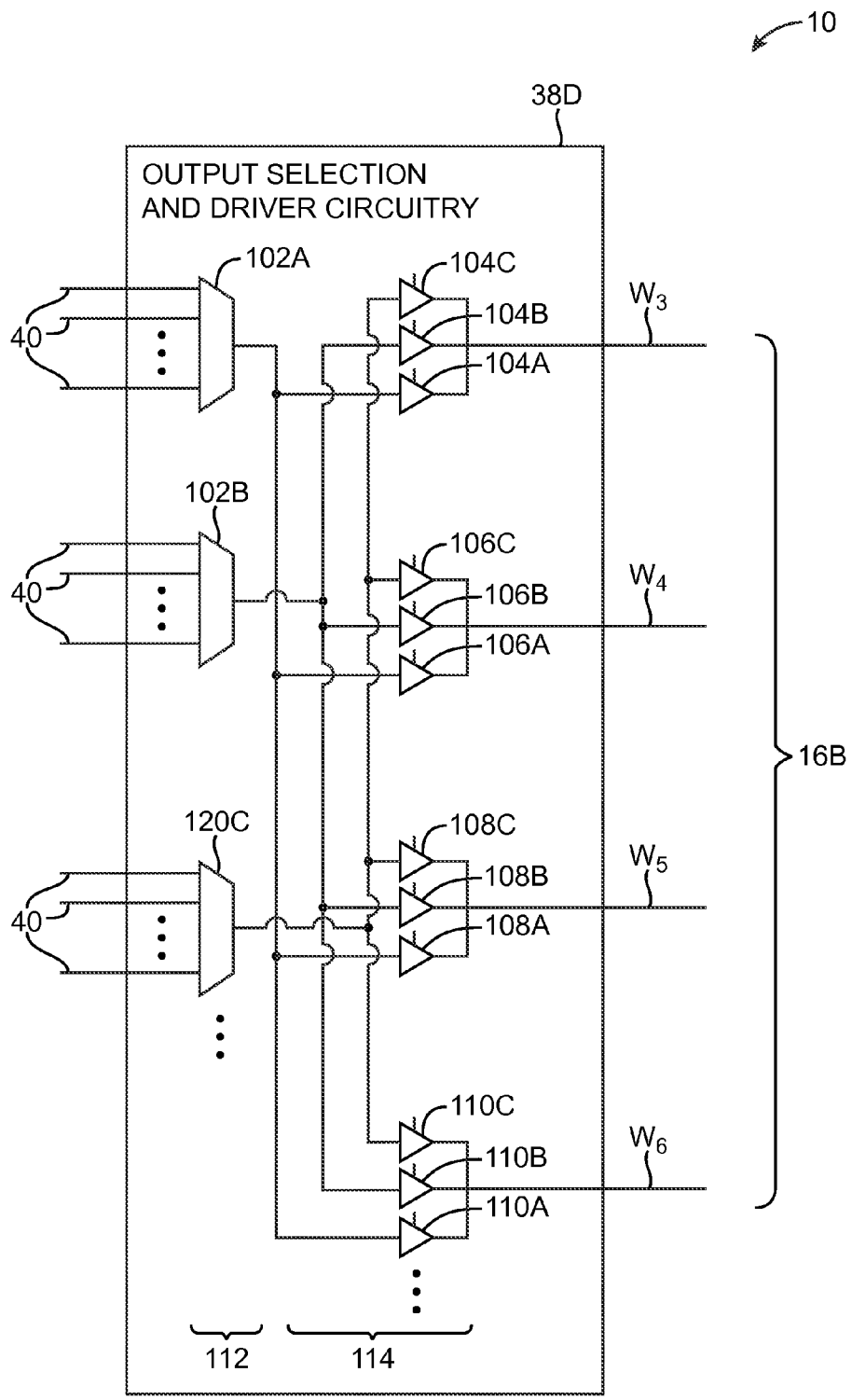
FIG. 5D is an illustrative diagram of output selection and driver circuitry with an output selection stage and an interconnect selection stage formed with tristate drivers in accordance with an embodiment of the present invention.

Selection of interconnects may be performed using tristate drivers instead of multiplexing circuitry. FIG. 5D shows an illustrative example in which output selection and driver circuitry 38D is provided with interconnect selection stage 114 that is formed from tristate drivers 104 (e.g., 104A, 104B, and 104C), 106 (e.g., 106A, 106B, and 106C), 108 (e.g., 108A, 108B, and 108C), and 110 (e.g., 110A, 110B, and 110C). The tristate drivers may receive the outputs that are selected by output selection stage 112. For example, tristate driver 104A may receive the output selected by multiplexer 102A, tristate driver 104B may receive the output selected by multiplexer 102B, and tristate driver 104C may receive the output selected by multiplexer 102C.

Each tristate driver may be configured to drive a corresponding interconnect with an output received from output selection stage 112 or may be configured to electrically disconnect that interconnect. For example, tristate driver 106A may be configured to drive interconnect W4 with the output selected by multiplexer 102A of output selection stage 112. The tristate drivers may be configured by loading corresponding memory elements (not shown) with appropriate control values.

Tristate drivers 104, 106, 108, and 110 may provide output selection and driver circuitry 38D with improved flexibility when selecting which interconnects will be driven with any given output. The tristate drivers may be configured to drive multiple interconnects with an output that is selected by a single multiplexer 102. For example, an output selected by multiplexer 102C may be driven onto interconnects W3, W4, W5, and W6 by enabling tristate drivers 104C, 106C, 108C, and 110C. As another example, an output selected by multiplexer 102B may be driven onto interconnects W3 and W5 without driving interconnects W4 and W6 by enabling tristate drivers 104B and 108B and disabling tristate drivers 106B and 110B.

Interconnects W3, W4, W5, and W6 may be simultaneously driven by multiple tristate drivers. For example, an output that is produced by a single logic region (e.g., a single logic element) may be provided to multiplexers 102A, 102B, and 102C. In this scenario, multiplexers 102A, 102B, and 102C may each be configured to select the output and tristate drivers 104A, 104B, and 104C may each be enabled. By simultaneously enabling tristate drivers 104A, 104B, and 104C, interconnect W3 may be driven with the combined drive strength of tristate drivers 104A, 104B, and 104C. If desired, the individual drive strengths of tristate drivers 104A, 104B, and 104C may be reduced (e.g., because the combined drive strength of drivers 104A, 104B, and 104C may be sufficient to drive interconnect W3).

The area on device 10 that is available for forming interconnects is generally limited (e.g., some or most of the area on device 10 may be occupied by transistors or other logic circuit elements). It is generally desirable to maximize the density of interconnects on device 10, so as to efficiently utilize the available area. However, as interconnect density is increased, cross-talk between signals that are conveyed by the interconnects may increase to unsatisfactory levels. For example, parasitic capacitance between the interconnects may generate increased crosstalk between signals that are driven onto the interconnects.

Figure 6:
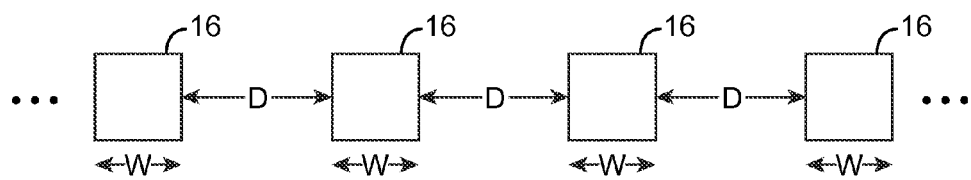
FIG. 6 is an illustrative diagram of interconnects with increased density in accordance with an embodiment of the present invention.

FIG. 6 shows a cross-sectional view of interconnects 16 that may be driven by output selection and driver circuitry to convey data throughout device 10. As shown by FIG. 6, interconnects 16 may each have width W and may be separated by distance D. Distance D may be a minimum distance that maintains crosstalk between interconnects 16 at acceptable levels. For example, parasitic capacitance between the interconnects may be inversely proportional to distance D. In this scenario, the parasitic capacitance may allow signals that are transmitted along an interconnect to couple onto nearby interconnects (e.g., via capacitive coupling).

Crosstalk between adjacent interconnects may potentially increase signal delay. For example, a first signal that is driven onto a first interconnect may couple (e.g., via capacitive coupling) onto a second interconnect and interfere with a second signal that is being transmitted on the second interconnect.

Output selection and driver circuitry with interconnect selection capabilities (e.g., using tristate drivers as shown in FIGS. 5B and 5D), may be configured to accommodate crosstalk between interconnects. For example, a first interconnect that can potentially receive unacceptable levels of crosstalk from a second, adjacent interconnect may be disconnected (e.g., by configuring tristate drivers that are coupled to the first interconnect to disconnect the first interconnect). As another example, multiple tristate drivers may be enabled to drive a single interconnect with a combined drive strength that is sufficient to overcome crosstalk from nearby interconnects.

In some scenarios, crosstalk between adjacent interconnects may reduce signal delay. For example, a given signal may be routed from output selection and driver circuitry 38D of FIG. 5D to two different locations on device 10. In this scenario, interconnect selection stage 114 may be configured to drive adjacent interconnects with that signal (e.g., so that constructive crosstalk occurs between the adjacent interconnects).

By configuring tristates to accommodate interference associated with signal crosstalk, the interconnect density on device 10 may be increased while maintaining acceptable interconnect signal delays. For example, the separation distance D between interconnects of 44 um may be reduced from 126 um to 44 um, thereby increasing the interconnect density by a factor of approximately two.

The example of FIG. 6 in which each interconnect 16 has the same width W and are separated by the same distance D is merely illustrative. If desired, interconnects 16 may be formed with various widths and distances. Interconnect drivers such as tristate drivers may be formed with drive strengths based at least partly on the width of interconnects (e.g., because relatively wide interconnects may have less resistance than relatively thin). If desired, interconnects 16 may be formed at different distances from adjacent interconnects 16. Tristate drivers may be configured to accommodate different crosstalk levels based on the distances that separate interconnects 16.

Figure 7:
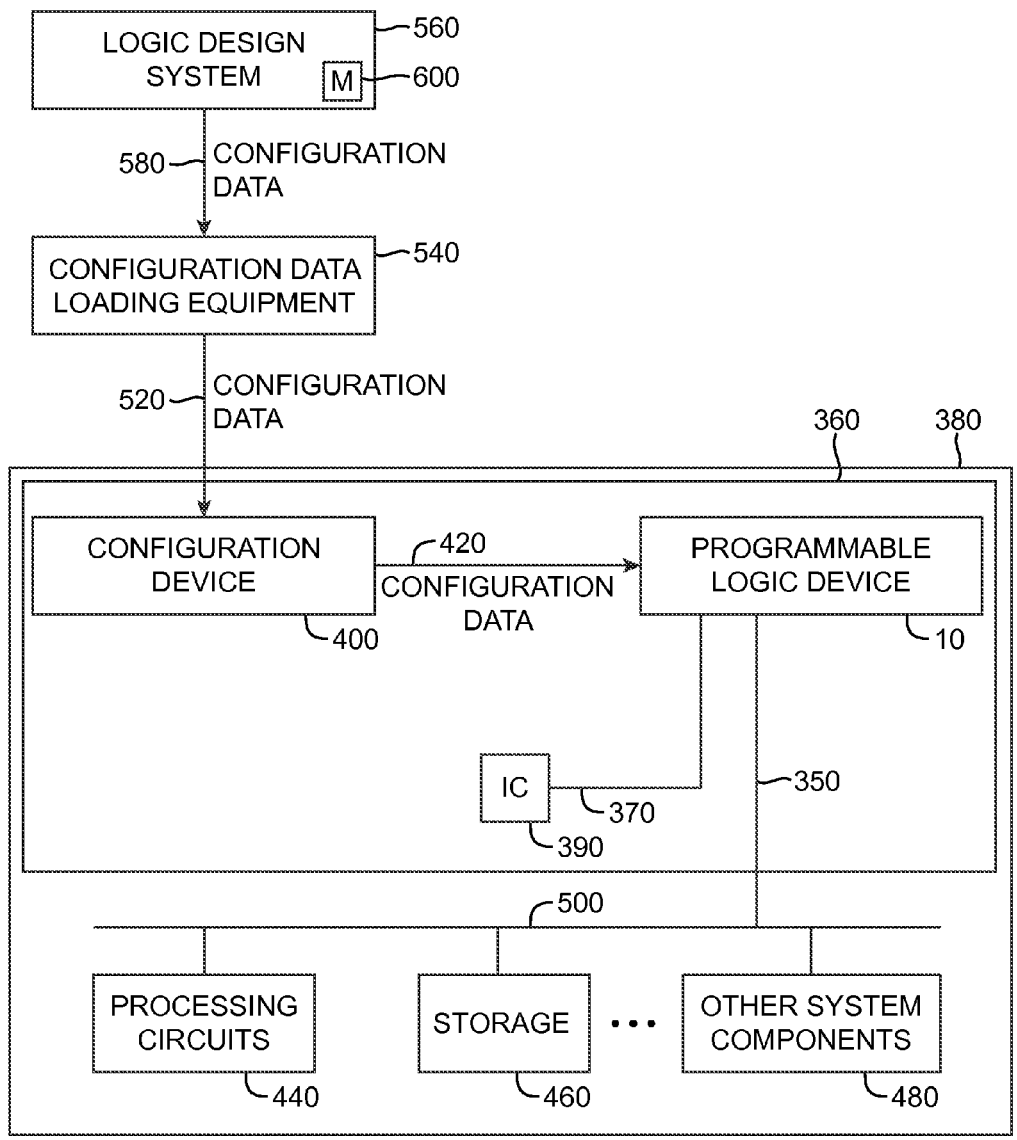
FIG. 7 is a diagram of an illustrative system environment in which a programmable integrated circuit is configured using a logic design system in accordance with an embodiment of the present invention.

An illustrative system environment for integrated circuits such as programmable integrated circuits is shown in FIG. 7. Device 10 may be mounted on a board 360 in a system 380. Device 10 may receive configuration data from programming equipment or from any other suitable equipment or device.

In the example of FIG. 7, device 10 is a type of programmable integrated circuit that receives configuration data from an associated integrated circuit 400. With this type of arrangement, circuit 400 may, if desired, be mounted on the same board 36 as device 10. Circuit 400 may be a programmable logic device configuration data loading chip that loads configuration data into programmable logic device memory from an external electrically erasable-programmable read-only memory (EEPROM) chip, a programmable logic device configuration data loading chip with built-in memory (sometimes referred to as a configuration device), or any other suitable device. When system 380 boots up (or at another suitable time), the configuration data may be supplied to device 10 from device 400, as shown schematically by path 420. The configuration data that is supplied to device 10 may be stored in its configuration random-access-memory elements 20.

System 380 may include processing circuits 440, storage 460, and other system components 480 that communicate with device 10. The components of system 380 may be located on one or more boards such as board 360 or other suitable mounting structures or housings.

Communication paths may be used to interconnect device 10 to other components. For example, communication path 370 may be used to convey data between an integrated circuit 390 that is mounted on board 360 and device 10. Communication paths 350 and 500 can be used to convey signals between device 10 and components 440, 460, and 480.

Configuration device 400 may be supplied with the configuration data for device 10 over a path such as path 520. Configuration device 400 may, for example, receive the configuration data from configuration data loading equipment 540 or other suitable equipment that stores the configuration data in configuration device 400. Device 400 may be loaded with data before or after installation on board 360.

It can be a significant undertaking to design and implement a desired logic circuit in a programmable logic device. Logic designers therefore generally use logic design systems based on computer-aided-design (CAD) tools to assist them in designing circuits. A logic design system (sometimes referred to as a circuit design system) can help a logic designer design and test complex circuits for a system. When a design is complete, the logic design system may be used to generate configuration data for electrically programming the appropriate programmable logic device. The logic design system may be implemented on computing equipment.

As shown in FIG. 7, the configuration data produced by a logic design system 560 may be provided to equipment 540 over a path such as path 580. Equipment 540 provides the configuration data to device 400 so that device 400 can later provide this configuration data to device 10 over path 420. System 560 may be based on one or more computers and one or more software programs. In general, software and data may be stored on any computer-readable medium (storage) in system 560 and is shown schematically as storage 600.

In a typical scenario, logic design system 560 is used by a logic designer to create a custom circuit design. The system 560 produces corresponding configuration data which is provided to configuration device 400. Upon power-up, configuration device 40 and data loading circuitry on device 10 is used to load the configuration data into the programmable memory elements 20 of device 10. Device 10 may then be used in normal operation of system 38.

Figure 8:
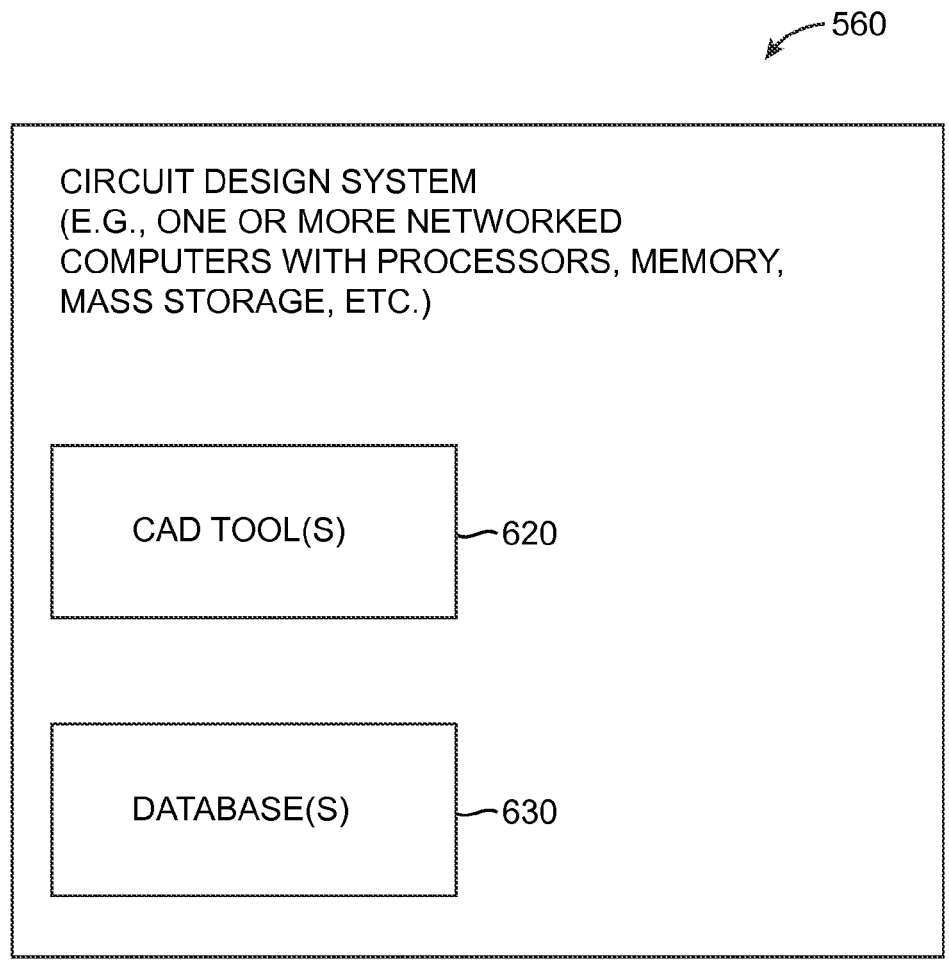
FIG. 8 is a diagram of a logic design system for generating configuration data for implementing custom circuit designs in programmable logic devices in accordance with one embodiment of the present invention.

An illustrative logic design system 560 in accordance with the present invention is shown in FIG. 8. System 560 may be based on one or more processors such as personal computers, workstations, etc. The processor(s) may be linked using a network (e.g., a local or wide area network). Memory in these computers or external memory and storage devices such as internal and/or external hard disks may be used to store instructions and data.

Software-based components such as computer-aided design tools 620 and databases 630 reside on system 560. During operation, executable software such as the software of computer aided design tools 620 runs on the processor(s) of system 560. Databases 630 are used to store data for the operation of system 560. In general, software and data may be stored on any computer-readable medium (storage) in system 560. Such storage, which is shown schematically as storage 600 of FIG. 7, may include computer memory chips, removable and fixed media such as hard disk drives, flash memory, compact discs (CDs), DVDs, other optical media, and floppy diskettes, tapes, or any other suitable memory or storage device(s). When the software of system 560 is installed, the storage 600 of system 560 has instructions and data that cause the computing equipment in system 560 to execute various methods (processes). When performing these processes, the computing equipment is configured to implement the functions of the logic design system.

The computer aided design (CAD) tools 620, some or all of which are sometimes referred to collectively as a CAD tool, may be provided by a single vendor or multiple vendors. Tools 620 may be provided as one or more suites of tools (e.g., a compiler suite for performing tasks associated with implementing a circuit design in a programmable logic device) and/or as one or more separate software components (tools). Database(s) 630 may include one or more databases that are accessed only by a particular tool or tools and may include one or more shared databases. Shared databases may be accessed by multiple tools. For example, a first tool may store data for a second tool in a shared database. The second tool can access the shared database to retrieve the data stored by the first tool. This allows one tool to pass information to another tool. Tools may also pass information between each other without storing information in a shared database if desired.

Figure 9:
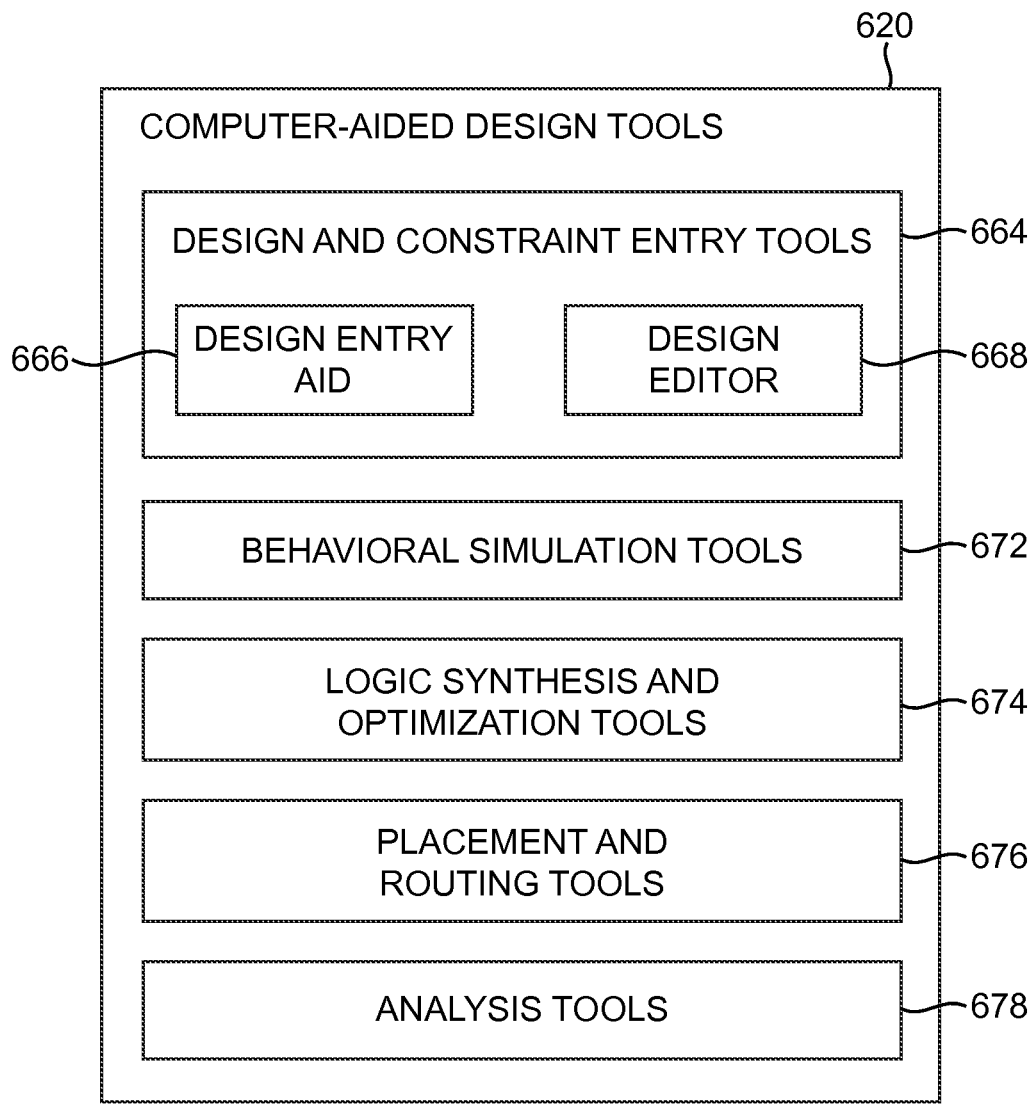
FIG. 9 is a diagram of illustrative computer-aided design (CAD) tools used in a logic design system in accordance with one embodiment of the present invention.

Illustrative computer aided design tools 620 that may be used in a logic design system such as system 560 of FIGS. 7 and 8 are shown in FIG. 9.

The design process typically starts with the formulation of logic circuit functional specifications. A logic designer can specify how a desired circuit should function using design and constraint entry tools 664. Design and constraint entry tools 664 may include tools such as design and constraint entry aid 666 and design editor 668. Design and constraint entry aids such as aid 666 may be used to help a logic designer locate a desired design from a library of existing logic designs and may provide computer-aided assistance to the logic designer for entering (specifying) the desired design. As an example, design and constraint entry aid 666 may be used to present screens of options for a user. The user may click on on-screen options to select whether the circuit being designed should have certain features. Design editor 668 may be used to enter a design (e.g., by entering lines of hardware description language code), may be used to edit a design obtained from a library (e.g., using a design and constraint entry aid), or may assist a user in selecting and editing appropriate prepackaged code/designs.

Design and constraint entry tools 664 may be used to allow a logic designer to provide a desired logic design using any suitable format. For example, design and constraint entry tools 664 may include tools that allow the logic designer to enter a logic design using truth tables. Truth tables can be specified using text files or timing diagrams and may be imported from a library. Truth table logic design and constraint entry may be used for a portion of a large circuit or for an entire circuit.

As another example, design and constraint entry tools 664 may include a schematic capture tool. A schematic capture tool may allow the logic designer to visually construct logic circuits from constituent parts such as logic gates and groups of logic gates. Libraries of preexisting logic circuits may be used to allow a desired portion of a design to be imported with the schematic capture tools.

If desired, design and constraint entry tools 664 may allow the logic designer to provide a logic design to the logic design system 560 using a hardware description language such as Verilog hardware description language (HDL) or Very High Speed Integrated Circuit Hardware Description Language (VHDL). The designer of the logic circuit can enter the logic design by writing hardware description language code with editor 668. Blocks of code may be imported from user-maintained or commercial libraries if desired.

After the design has been entered using design and constraint entry tools 664, behavioral simulation tools 672 may be used to simulate the functional performance of the design.

If the functional performance of the design is incomplete or incorrect, the logic designer can make changes to the design using design and constraint entry tools 664. The functional operation of the new design can be verified using behavioral simulation tools 672 before synthesis operations have been performed using tools 674. Simulation tools such as tools 672 may also be used at other stages in the design flow if desired (e.g., after logic synthesis). The output of the behavioral simulation tools 672 may be provided to the logic designer in any suitable format (e.g., truth tables, timing diagrams, etc.).

Once the functional operation of the logic design has been determined to be satisfactory, logic synthesis and optimization tools 674 may be used to implement the logic design in a particular programmable logic device (i.e., in the logic and interconnect resources of a particular programmable logic device product or product family).

Tools 674 attempt to optimize the design by making appropriate selections of hardware to implement different logic functions in the logic design based on the logic design data and constraint data entered by the logic designer using tools 664.

After logic synthesis and optimization using tools 674, the logic design system may use tools such as placement and routing tools 676 to perform physical design steps (layout synthesis operations). Placement and routing tools 676 are used to determine how to place the circuits for each logic function within the programmable logic device. For example, if two counters interact with each other, the placement and routing tools 676 may locate these counters in adjacent logic regions on the programmable logic device to reduce interconnect delays or to satisfy timing requirements specifying the maximum permitted interconnect delay. The placement and routing tools 676 create orderly and efficient implementations of logic designs for a given programmable logic device.

Tools such as tools 674 and 676 may be part of a compiler suite (e.g., part of a suite of compiler tools provided by a programmable logic device vendor). In accordance with the present invention, tools such as tools 674, 676, and 678 automatically take into account the effects of crosstalk between interconnects while implementing a desired circuit design. This allows tools 674 and 676 to satisfy performance requirements (e.g., timing requirements) when generating configuration data for programming integrated circuits such as programmable integrated circuit 10.

After an implementation of the desired logic design in the programmable logic device has been generated using placement and routing tools 676, the implementation of the design may be analyzed and tested using analysis tools 678. After satisfactory optimization operations have been completed using tools 620, tools 620 can produce the configuration data for the programmable logic device.

Figure 10:
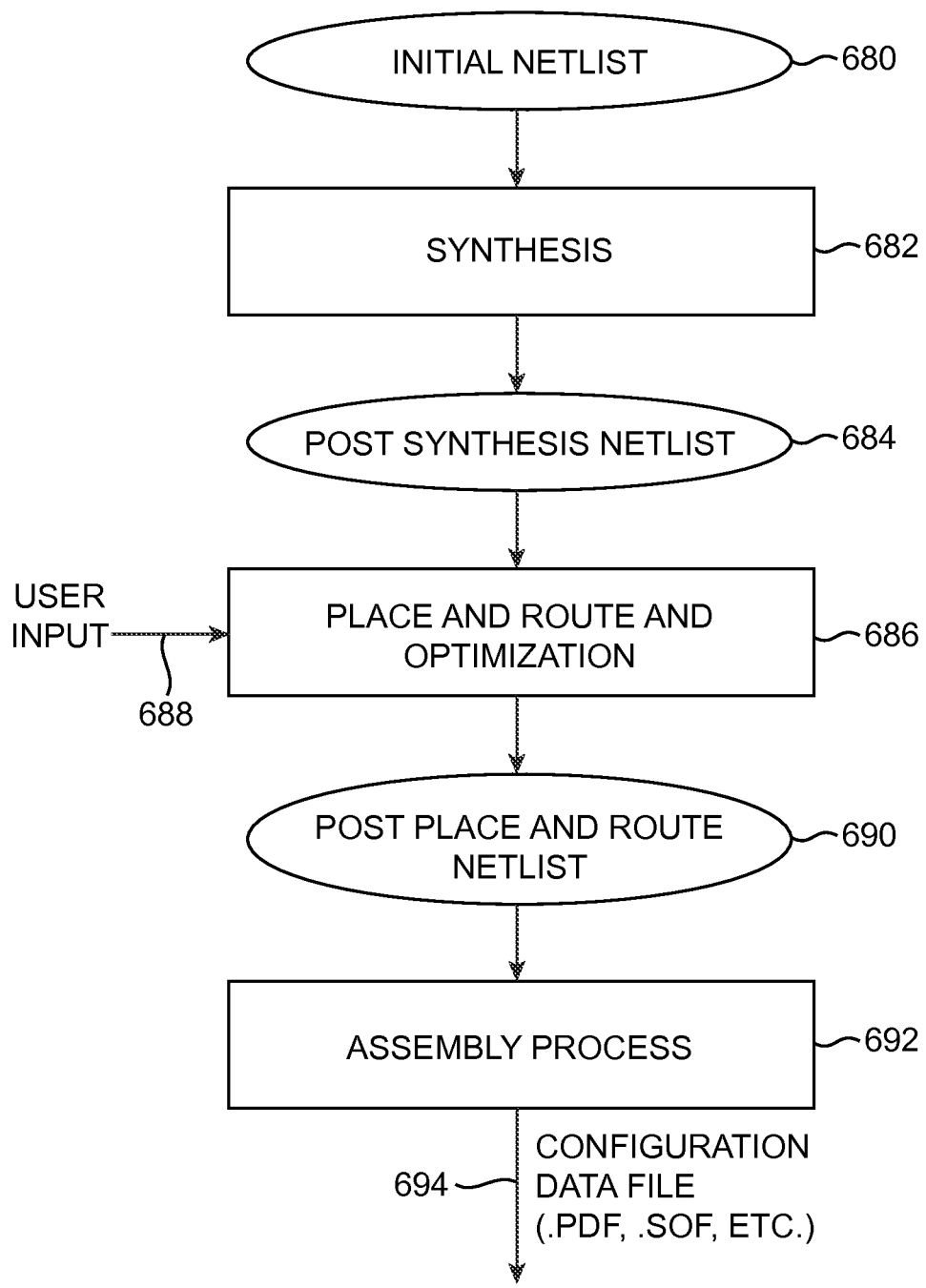
FIG. 10 is a flow chart of illustrative steps for designing a custom logic circuit and producing configuration data for that circuit in accordance with one embodiment of the present invention.

Illustrative operations involved in using tools 620 of FIG. 9 to produce configuration data files are shown in FIG. 10. As shown in FIG. 10, an initial netlist 680 is synthesized at step 682 to produce a post-synthesis netlist 684. At step 686, user input 688 and the post synthesis netlist 684 are processed during place and route and optimization operations. During the operations of step 686, the CAD tools 620 may optimize the configuration of output selection and driver circuitry to reduce crosstalk levels between interconnects (e.g., by selectively re-routing signals and/or double-driving signals). The resulting netlist 690 is processed further during an assembly process 692 to produce a configuration data file output 694 (e.g., a .pof or .sof file).

Figure 11:
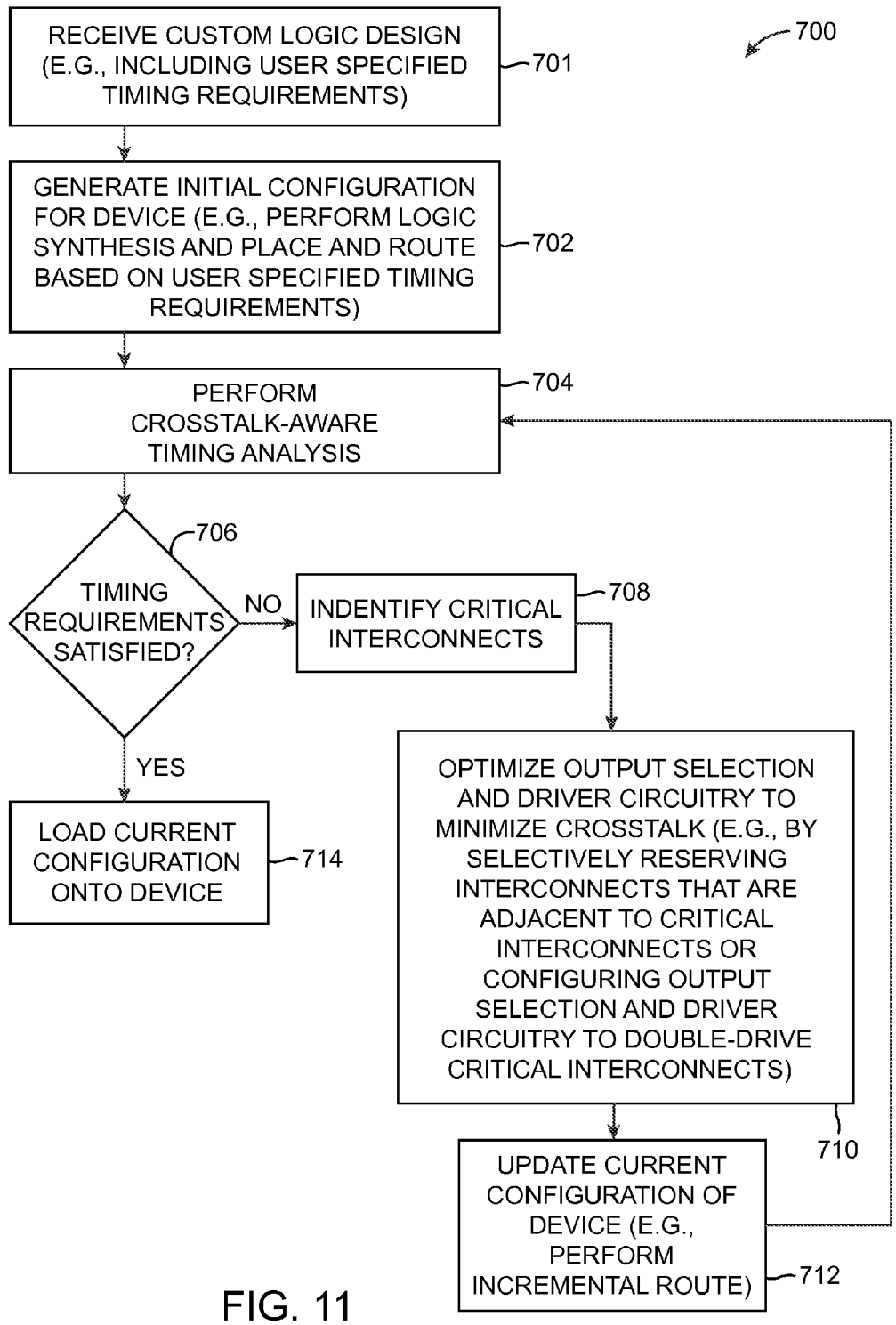
FIG. 11 is an illustrative flowchart for performing crosstalk-aware timing analysis to produce configuration data of a programmable integrated circuit in accordance with an embodiment of the present invention.

Logic design system 560 may be used to determine the configuration of output selection and driver circuitry such as 38A, 38B, 38C, and 38D for a given custom circuit design (e.g., by generating configuration data that can be used by configuration device 400 to program device 10). Logic design system 560 may configure the output selection and driver circuitry to optimize signal routing for a particular custom circuit design (e.g., to conserve interconnect resources and/or to accommodate crosstalk between interconnects. FIG. 11 shows an illustrative flow chart 700 in which logic design system 560 having CAD tools 620 may determine an optimal configuration for output selection and driver circuitry and configure the output selection and driver circuitry using the determined configuration. The steps of flow chart 700 may be performed during step 686 of FIG. 10 and may be performed using tools such as logic synthesis and optimization tools 674, placement and routing tools 676, and analysis tools 678.

At step 701, tools such as design and constraint entry tools 664 use input screens to obtain the desired custom logic design from the logic designer. The design includes design constraints such as timing constraints (e.g., timing requirements), signal strength constraints, logic function constraints, etc.

During step 701, the user can specify constraints such as delay or speed limits, current drive limits, noise level limits, core voltage settings, I/O voltage settings, etc. For example, a user may specify a requirement or preference that a particular interconnect operate at a particular minimum speed or maximum delay. If desired, settings such as these may be provided as defaults (e.g., when a user does not specify any such constraints).

In step 702, initial configuration data for programming device 10 may be determined using tools 72 and 74. Logic design system 560 may determine the initial configuration so that device 10 implements a custom user design while attempting to satisfy timing requirements. The timing requirements may limit the maximum interconnect delay between programmable logic regions. The initial configuration may be determined based on heuristics that identify tradeoffs between factors such as delay, performance, and area. The operations of step 702 may sometimes be referred to generally as place and route.

In step 704, logic design system 560 may perform a timing analysis of the current configuration. For example, logic design system 560 may perform a static timing analysis or other methods suitable for estimating signal delay. The timing analysis may estimate the signal delay that is associated with traversing each interconnect. The timing analysis may include analysis of potential crosstalk between interconnects or other routing paths in device 10. For example, logic design system 560 may estimate an increased delay value for an interconnect that is subject to interference from signals on nearby interconnects. As another example, logic design system 560 may estimate a decreased delay value for an interconnect with adjacent interconnects that are driven with the same signal. The timing analysis performed by logic design system 560 may sometimes be referred to as a crosstalk-aware timing analysis, because the timing analysis accommodates delay variations that are associated with crosstalk.

In step 706, logic design system 560 may use results from the timing analysis performed in step 704 to determine whether the current configuration of device 10 satisfies timing requirements (e.g., timing requirements that are associated with a user-defined performance level). The user-defined performance level may be a desired clock frequency at which device 10 should operate. For example, the desired clock frequency may be 400 MHz, 500 MHz, 600 MHz, or more. Each desired clock speed may correspond to a maximum interconnect delay. For example, a desired clock speed of 500 MHz may correspond to a maximum interconnect delay of 2 ns. In this scenario, the current configuration may fail to satisfy timing requirements if one or more estimated interconnect delays exceed 2 ns or if the signal delay of any interconnect path (e.g., an interconnect path formed from multiple interconnects) exceeds 2 ns.

If the current configuration does not satisfy timing requirements, the operations of step 708 may be performed. If the current configuration satisfies the timing requirements, the operations of step 714 may be performed by logic design system 560 to load the current configuration onto device 10 (e.g., via configuration data loading equipment 540 and configuration device 400).

In step 708, logic design system 560 may identify interconnects that are associated with critical paths (e.g., interconnect paths with signal delays that potentially exceed timing requirements). The identified interconnects may sometimes be referred to as critical interconnects. The timing requirements may be determined based on the desired performance level (e.g., a desired clock frequency). Alternatively, logic design system 560 may be configured to increase performance. In this scenario, logic design system 560 may identify interconnects that are associated with routing paths that have the greatest estimated signal delay values. If desired, logic design system 560 may use heuristics to identify a reasonable number of interconnects. For example, logic design system 560 may limit the number of identified critical interconnects to a predetermined percentage of the total number of interconnects.

Logic design system 560 may additionally identify interconnects that are adjacent to the critical interconnects. For example, logic design system 560 may identify a given interconnect as a critical interconnect. In this scenario, logic design system 560 may also identify which interconnects of device 10 are adjacent to that given interconnect (e.g., because signals transmitted on the adjacent interconnects may potentially interfere with signals transmitted on the critical interconnect).

In step 710, logic design system 560 may optimize output selection and driver circuitry 38 of each programmable logic region 18 to reduce crosstalk for the identified critical interconnects. Logic design system 560 may configure interconnect selection stages such as interconnect selection stage 114 of FIG. 5D to route signals away from interconnects that are adjacent to the identified critical interconnects. Consider the scenario in which interconnect W4 of FIG. 5D has been identified as a critical interconnect. In this scenario, logic design system 560 may route signals away from adjacent interconnects W3 and W5 by disabling tristate drivers 104 and 108. In other words, logic design system 560 may reserve adjacent interconnects W3 and W5 so that output signals are not routed through interconnects W3 and W5. The output signals that are displaced by the reservation of interconnects W3 and W5 may be re-routed during step 712. For example, logic design system 560 may re-route the displaced output signals by enabling tristate drivers that are coupled to other interconnects that are not adjacent to interconnect W4 (e.g., interconnect W6 or other interconnects). By routing signals away from interconnects that are adjacent to the identified critical interconnects, logic design system 560 may reduce crosstalk for the critical interconnects and improve system performance (e.g., by reducing signal delay associated with the critical interconnects).

Logic design system 560 may configure output selection and driver circuitry 38 to simultaneously drive selected critical interconnects with multiple tristate drivers (e.g., to double-drive selected critical interconnects). The critical interconnects that are driven by multiple tristate drivers may be selected based on available resources in the current device configuration.

Consider the scenario in which interconnect W6 of FIG. 5D is identified as a critical interconnect and is currently being driven by tristate driver 110A with an output signal that is produced by a logic region and selected by multiplexer 102A. In this scenario, logic design system 560 may determine whether the output signal can be routed through multiplexers 102B or 102C (e.g., by determining whether multiplexers 102B and 102C are not being used in the current device configuration). In response to determining that the output signal can be routed through multiplexer 102B and/or 102C, logic design system 560 may configure multiplexer 102B and/or 102C and corresponding tristate drivers 110B and 110C to route the output signal to interconnect W6.

In step 712, logic design system 560 may update the current configuration based on changes determined during steps 710 and 712. During step 712, logic design system 560 may determine new routing paths for output signals that have been displaced (e.g., output signals that were displaced during step 710 by the reservation of interconnects that are adjacent to critical interconnects). The new routing paths may be formed using interconnects that have not been reserved or used to route other output signals. The process may then loop back to step 704 to determine whether the updated configuration satisfies timing requirements and potentially perform additional optimizations.

The foregoing is merely illustrative of the principles of this invention and various modifications can be made by those skilled in the art without departing from the scope and spirit of the invention. The foregoing embodiments may be implemented individually or in any combination.

What is claimed is:

1. A method for using logic design system computing equipment, comprising:
   generating configuration data for an integrated circuit that includes driver circuitry for generating output signals over corresponding interconnects, wherein generating the configuration data comprises:
   identifying a given interconnect in the interconnects that fails to satisfy performance criteria;
   identifying an adjacent interconnect that is adjacent to the given interconnect failing the performance criteria; and
   generating configuration data that programs circuitry on the integrated circuit to reduce interference with the given interconnect.

2. The method defined in claim 1, further comprising:
   storing the configuration data on a storage medium in the logic design system.

3. The method defined in claim 1, wherein generating configuration data that programs circuitry on the integrated circuit to reduce interference with the given interconnect comprises:
   configuring the driver circuitry to route signals away from the adjacent interconnect.

4. The method defined in claim 3, wherein configuring the driver circuitry to route signals away from the adjacent interconnect comprises:
   disabling tristrate drivers that are coupled to the adjacent interconnect.

5. The method defined in claim 1, further comprising:
   generating configuration data that programs circuitry on the integrated circuit to reduce crosstalk between the given interconnect and the adjacent interconnect by enabling multiple tristate drivers that are coupled to the given interconnect.

6. The method defined in claim 1, wherein identifying the given interconnect that fails to satisfy the performance criteria comprises:
   estimating crosstalk levels between the given interconnect and the adjacent interconnect.

7. The method defined in claim 6, wherein estimating the crosstalk levels between the given interconnect and the adjacent interconnect comprises determining a distance between the given interconnect and the adjacent interconnect.

8. The method defined in claim 1, wherein identifying the given interconnect that fails to satisfy the performance criteria comprises:
   estimating signal delay associated with the given interconnect.

9. The method defined in claim 1, further comprising:
   a plurality of programmable logic regions that provide the output signals to the driver circuitry, wherein generating the configuration data comprises generating configuration data that configures the plurality of programmable logic regions.

10. A method of generating configuration data for an integrated circuit with a logic design tool, wherein the integrated circuit includes output driver circuits that drive output signals onto a plurality of routing paths, the method comprising:
    generating first configuration data that configures the output driver circuits to drive the output signals onto the plurality of routing paths;
    determining whether the output driver circuits configured using the first configuration data satisfy performance requirements; and
    in response to determining that the output driver circuits configured using the first configuration data fails to satisfy the performance requirements, modifying the first configuration data to drive a routing path in the plurality of routing paths with at least two of the output driver circuits simultaneously.

11. The method defined in claim 10, wherein the integrated circuit also includes a plurality of configurable logic regions, and wherein the first configuration data configures the plurality of configurable logic regions to provide the output signals to the output driver circuits.

12. The method defined in claim 10, wherein determining whether the output driver circuits configured using the first configuration data satisfy the performance requirements comprises:
    estimating an amount of coupling among the plurality of routing paths.

13. The method defined in claim 10, wherein determining whether the output driver circuits configured using the first configuration data satisfy the performance requirements comprises:
    estimating delays associated with the output signals being routed through each of the plurality of routing paths.

14. The method defined in claim 10, wherein the output driver circuits include tristate drivers.

15. A method of configuring a programmable integrated circuit using a logic design tool, wherein the integrated circuit includes output driver circuits that drive output signals onto a plurality of interconnects, the method comprising:
    generating initial configuration data that configures the output driver circuits to drive the output signals onto the plurality of interconnects in a first configuration;
    analyzing an amount of crosstalk among the plurality of interconnects; and
    based on the analysis of the amount of crosstalk among the plurality of interconnects, modifying the initial configuration so that the output driver circuits drive the output signals onto the plurality of interconnects in a second configuration that is different than the first configuration, wherein the second configuration configures at least two of the output driver circuits to double-drive a selected one of the plurality of interconnects.

16. The method defined in claim 15, wherein analyzing the amount of crosstalk among the plurality of interconnects comprises estimating delay values associated with each of the plurality of interconnects.

17. The method defined in claim 15, further comprising:
    determining whether the initial configuration data satisfies predetermined design constraints based on the amount of crosstalk.

18. The method defined in claim 15, wherein the second configuration reserves at least one of the plurality of interconnects as an unused interconnect.

* * * * *